_United States Patent Office_ 3,035,096
Patented May 15, 1962

3,035,096
VINYL DIPHENYLPHOSPHINE OXIDE AND
METHOD OF PRODUCING SAME
Robert S. Cooper, Park Forest, Ill., assignor to Stauffer Chemical Company, New York, N.Y., a corporation of Delaware
No Drawing. Filed July 7, 1960, Ser. No. 41,251
4 Claims. (Cl. 260—606.5)

This invention relates to the new compound vinyl diphenylphosphine oxide and a method for its production. The new compound may be used in the production of valuable flame-resistant polymers and copolymers with ethylenically unsaturated esters and resin compositions. It is also quite useful as an intermediate for phosphonoethyl diphenylphosphine oxides and a wide variety of derivatives obtainable by the reaction of the unsaturated double bond of the vinyl group with halogens and organic compounds containing active hydrogen atoms such as organic phosphites, alkyl esters of malonic, aconitic and citraconic, etc. acids and the unsaturated organic esters such as the alkyl esters of maleic, fumaric, etc. acids. Such derivatives have a variety of uses, for example, the chlorinated derivative may be used as a solvent extractant for ferric iron.

Vinyl diphenylphosphine oxide may be suitably prepared by first isomerizing beta-chloroethyl diphenylphosphinite to produce beta-chloroethyl diphenylphosphine oxide and then dehydrohalogenating this intermediate to produce the new compound. The starting beta-chloroethyl diphenylphosphinite material can be obtained by reacting diphenylphosphinous chloride with an excess of ethylene oxide at a temperature below 50° C. until the addition reaction is completed and then vaporizing off the excess unreacted ethylene oxide.

*Example 1*

In the preparation of vinyl diphenylphosphine oxide 2.26 moles of beta-chloroethyl diphenylphosphinite was placed in a one liter flask fitted with Tru-Bore vacuum stirrer, thermometer and distilling head. The contents of the flask were heated to 130° C. at 3–5 mm. Hg pressure when an exothermic reaction began. The temperature was held at 140°–150° C. for 10 minutes, then at 150°–155° C. by external cooling means. As the temperature began to drop heat was applied to maintain the reaction temperature within the range of 150°–160° C. for about 2 hours. The reaction under these conditions resulted in the isomerization of the beta-chloroethyl diphenylphosphinite to beta-chloroethyl diphenylphosphine oxide and conversion of the trivalent phosphorus to its pentavalent state. This intermediate beta-chloroethyl diphenylphosphine oxide was a white solid having a melting point of 129°–140° C. It was then further heated to a temperature of about 195° C. at 1 mm. pressure when the pressure suddenly increased and hydrogen chloride began to be profusely evolved. Heat was supplied to maintain the dehydrochlorinating temperature. The dehydrochlorination was completed in about 2 hours and the pressure dropped back to about 1–1.5 mm. Hg. On further heating up to 197°–202° C. at 1–1.5 mm. pressure the vinyl diphenylphosphine oxide distilled over and was condensed, in a 79% yield, as a white crystalline product. The product was recrystallized from an acetone solution to give a hard white crystalline vinyl diphenylphosphine oxide having a melting point of 118°–119° C. Analysis showed 13.5% P (theory 13.6%) and an olefin bond equivalent of 98% of theory, no chlorine and less than 0.1% P+3. The compound was soluble in methanol, ethanol, acetone and ethyl acetate to an extent greater than 100 grams per 100 ml. of the solvent, and to an extent less than 0.5 grams per 100 ml. of solvent for toluene, xylene, carbon tetrachloride, perchloroethylene and water.

The beta-chloroethyl diphenylphosphine oxide intermediate compound may be separately recovered as a new compound, and separately dehyohalogenated to produce the vinyl diphenylphosphine oxide product. However, if desired, the beta-chloroethyl diphenylphosphine oxide need not be separated at the end of the isomerization stage of the process, but may be further heated to the dehydrochlorination temperature to produce the vinyl diphenylphosphine oxide product as shown in the above example.

*Example 2*

As an example of the preparation of the beta-chloroethyl diphenylphosphine oxide intermediate, 1000 grams of beta-chloroethyl diphenylphosphinite was placed in a reaction flask and heated to 120° C. in an atmosphere of nitrogen when an exothermic reaction began. The reaction temperature was held at 120°–130° C. for 20 minutes by external cooling, and at 130°–140° C. for 20 minutes, and at 140°–150° C. until the reaction was no longer exothermic. The product was then further heated at about 160° C. for two hours. The resulting beta-chloroethyl diphenylphosphine oxide was recovered in a 98% yield of a white crystalline product having a melting point of 130°–140° C. The product was soluble in methanol, ethanol and butyl alcohol, but only sparingly soluble in benzene, acetone, xylene, toluene and water.

*Example 3*

In an example for the preparation of the vinyl diphenylphosphine oxide, 3.9 moles of the beta-chloroethyl diphenylphosphine oxide from the above example was placed in a reaction flask, equipped with distilling head, and heated to 175°–200° C. at 2–10 mm. Hg pressure. Hydrogen chloride was copiously evolved and continuously removed from the flask. Heating was continued for 1½ hours to complete the dehydrochlorination reaction. The residual vinyl diphenylphosphine oxide product was distilled off and condensed as a white crystalline material having a melting point of approximately 118°–120° C. and a boiling point of 189°–196° C. at 1½ mm. pressure. The yield was 76.5%.

The vinyl diphenylphosphine oxide product may be readily homopolymerized or copolymerized with ethylenically unsaturated esters and resins in the pressure of an organic peroxide catalyst to form valuable solid resin products having flame self-extinguishing characteristics. The following examples illustrate this utiliy.

*Example 4*

Portions of vinyl diphenylphosphine oxide were mixed with 2, 3, 4 and 5% amounts of a ditertiary butyl peroxide polymerization catalyst and heated, under nitrogen, for 4 hours at 120°–130° C., 4 hours at 150°–155° C. and 16 hours at 165°–175° C. to effect homopolymerization. The resulting polmers were clear, straw to amber colored, hard brittle resins having flame self-extinguishing characteristics.

Vinyl diphenylphosphine oxide is compatible with and copolymerizes with numerous other monomers such as methyl methacrylate, styrene, divinyl benzene, diethyl maleate, unsaturated polyesters such as the commercial resin compositions known as "Laminacs," etc.

*Example 5*

Vinyl diphenylphosphine oxide was mixed with styrene in various proportions and copolymerized in the presence of 0.08% to 0.7% ditertiary buty peroxide by heating the mixtures for 8 hours at 110° C. and 20 hours at 150° C. in a glass container to form clear, hard tough the brittle copolymers. The copolymer obtained from a 90% styrene, 10% vinyl diphenylphosphine oxide mix showed a burning time of 5 seconds whereas the 80% to 20% mixture gave a burning time of 1 second, and a 70% to 30% mix gave a resin which showed no burning time.

The flame test for determining the burning time was carried out by heating a piece of the copolymer resin, about ¼″ in diameter, in the tip of a blue Bunsen flame for 15 seconds, then withdrawing the flame and measuring the time for the resin to stop burning in a relatively draft free area.

*Example 6*

In a similar manner the vinyl diphenylphosphine oxide was copolymerized in various proportions with an unsaturated polyester resin of the "Laminac" type. The Laminac resins are commercially available products comprising the partially polymerized unsaturated polyesters as described in U.S. Patents 2,443,736 and 2,443,739 containing an alkenyl aryl cross-linking agent, such as diallyl phthalate, and the reaction product of an alpha, beta, ethylenically unsaturated polycarboxylic acid, such as maleic or fumaric acid, a saturated polycarboxylic acid free of non-benzenoid unsaturation, such as phthalic acid and at least one glycol, such as ethylene glycol and/or diethylene glycol.

The resulting copolymers were hard, tough resins and were highly flame-resistant, with those obtained from mixtures containing at least about 25% of the vinyl diphenylphosphine oxide monomer having a burning time of less than 2 seconds.

The vinyl diphenylphosphine oxide of this invention may be chlorinated to produce 1,2-dichloroethyl diphenylphosphine oxide which is useful for the solvent extraction of ferric iron.

*Example 7*

Seventy-five grams of vinyl diphenylphosphine oxide was suspended in 400 ml. of carbon tetrachloride at 0°–5° C. and gaseous chlorine passed into the mixture until no further chlorine was absorbed. The resulting product was filtered off and recrystallized from benzene to give a white crystalline 1,2-dichloroethyl diphenylphosphine oxide with a melting point of 125°–128° C.

Five grams of this compound was dissolved in 95 grams of xylene, and this solution stirred vigorously with 100 ml. of a 1% ferric sulfate solution (pH 2.1) for 10 minutes. On separation of the organic layer it was found that 41% of the ferric ions had been extracted from the aqueous layer.

Further utility of the vinyl diphenylphosphine oxide is exemplified by the following examples where the compound is employed as an intermediate in adduction reactions with organic compounds containing active hydrogen atoms, such as the organic phosphites and unsaturated carboxylic acid esters.

*Example 8*

0.2 mole of vinyl diphenylphosphine oxide and 0.2 mole of diethyl phosphite were stirred together in a reaction flask while adding dropwise a catalyst solution of 2 grams of sodium dissolved in 100 ml. of ethanol. As the catalyst solution was added the temperature of the reaction mixture rose exothermically to about 100° C. when a clear solution resulted. The reaction took 19 minutes with a consumption of approximately 4 ml. of the catalyst solution. The reaction mixture was stirred at 110° C. for 30 minutes and poured, while hot, into 200 ml. of water saturated with $CO_2$. This solution was extracted with four 50 ml. portions of chloroform. Four hundred ml. of heptane was added to the chloroform solution and the mixture heated to volatilize off the chloroform and residual water. An additional 400 ml. of heptane was added and the mixture again heated to distill off approximately 400 ml. of solvent and other volatile matter. The mixture was then cooled and the product allowed to crystallize out. After filtering and drying the product under vacuum there was obtained 67.8 grams (92.6% yield) of a white crystalline diethyl phosphonoethyl diphenylphosphine oxide having a melting point of 108°–111° C. and a phosphorus content of 17.0% (theory 16.9%). The reaction involved may be expressed by the equation:

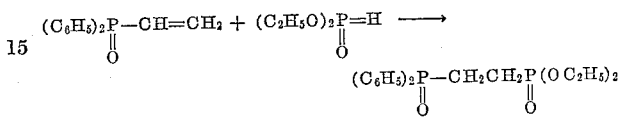

*Example 9*

0.5 mole of vinyl diphenyl phosphine oxide and 0.5 mole of diallyl phosphite were placed in a flask fitted with stirrer, thermometer and dropping funnel. A catalyst solution of 2 grams of sodium dissolved in 100 ml. of allyl alcohol was added drop-wise to the reaction mixture causing an exothermic rise in temperature to about 70° C. after 19 minutes and 5 ml. of the catalyst solution had been added. An additional 10 ml. of the catalyst solution was added and the mixture stirred for 60 minutes at 60° C. Then 100 ml. of a 5% $NaHCO_3$ solution was added and the mixture stirred for an additional 30 minutes. The organic layer was separated and stripped of volatiles up to 100° C. at 1 mm. Hg. pressure. The reaction product was filtered hot and on cooling yielded 192.5 grams (98.6% yield) of a white crystalline diallyl phosphonoethyl diphenylphosphine oxide product having a melting point of 90°–91° C. and a phosphorus content of 16.3% (theory 15.9%).

*Example 10*

The adduct of vinyl diphenylphosphine oxide and diethyl malonate was prepared in accordance with the equation:

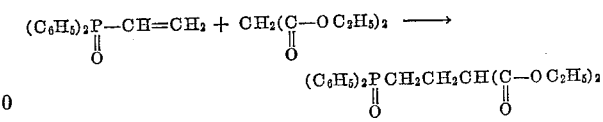

A sodium ethylate catalyst solution (2 grams Na per 100 ml. ethanol) was added dropwise to an ethanol solution of 0.5 mole vinyl diphenylphosphine oxide and 0.5 mole diethyl malonate. The exothermic reaction was controlled within the range of 50°–60° C. by the rate of addition of the catalyst solution over a period of 27 minutes. The reaction mixture was stirred for an additional 60 minutes and then neutralized with concentrated hydrochloric acid. The reaction mixture was then stripped of volatiles to 70° C. at 2 mm. pressure and recrystallized from benzene yielding 131 grams of a white crystalline product.

The above description has been given for clearness and understanding only and no unnecessary limitations are to be derived therefrom.

I claim:

1. Process for the production of vinyl diphenylphosphine oxide which comprises heating beta-chloroethyl diphenylphosphine oxide at a temperature, and for a sufficient period of time to dehydrochlorinate the beta-chloroethyl diphenylphosphine oxide to form vinyl diphenylphosphine oxide.

2. The process as in claim 1 where the dehydrochlorination is carried out under vacuum at a temperature from 175°–200° C.

3. Process for the production of vinyl diphenylphosphine oxide which comprises heating beta-chloroethyl diphenylphosphinite under vacuum at a temperature of 120°–160° C. for a sufficient period to isomerize the beta-chloroethyl diphenylphosphinite to beta-chloroethyl diphenylphosphine oxide, then further increasing the temperature to 175°–200° C. and maintaining this temperature until dehydrochlorination is completed to form the vinyl diphenylphosphine oxide product.

4. As a new chemical intermediate the compound beta-chloroethyl diphenylphosphine oxide.

References Cited in the file of this patent

Wittig et al.: Chem. Abs., vol. 50, page 10078 (1956).

Notice of Adverse Decision in Interference

In Interference No. 93,719 involving Patent No. 3,035,096, R. S. Cooper, VINYL DIPHENYLPHOSPHINE OXIDE AND METHOD OF PRODUCING SAME, final judgment adverse to the patentee was rendered Dec. 22, 1965, as to claims 1 and 4.

[*Official Gazette May 17, 1966.*]